United States Patent
Vaughn et al.

(10) Patent No.: US 6,334,354 B2
(45) Date of Patent: Jan. 1, 2002

(54) PORTABLE SINGLE CAR CHARGING AND TEST DEVICE

(75) Inventors: Lawrence E. Vaughn, Watertown, NY (US); Donald Crews, Fort Worth, TX (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/828,785

(22) Filed: Apr. 10, 2001

Related U.S. Application Data

(62) Division of application No. 09/324,841, filed on Jun. 3, 1999, now Pat. No. 6,269,682.

(51) Int. Cl.$^7$ .......................... G01L 5/28; G01M 3/02; B60T 11/26
(52) U.S. Cl. .............................. 73/39; 73/121; 303/66; 303/81; 303/86
(58) Field of Search ...................... 73/121, 39; 303/66, 303/81, 86

(56) References Cited

U.S. PATENT DOCUMENTS

| | | |
|---|---|---|
| 1,143,620 A | 6/1915 | Farmer |
| 1,997,749 A | 4/1935 | Safford |
| 2,032,121 A | 2/1936 | Farmer |
| 2,103,305 A | 12/1937 | Thomas |
| 2,509,816 A | 5/1950 | Elson |
| 2,637,201 A | 5/1953 | Meier |
| 2,674,121 A | 4/1954 | Gorman |
| 3,531,981 A | 10/1970 | Pommer |
| 3,596,500 A | 8/1971 | Rees |
| 3,872,711 A | 3/1975 | Atkinson et al. |
| 3,945,684 A | 3/1976 | Chellis |
| 3,958,454 A | 5/1976 | Rasch |
| 4,156,864 A | 5/1979 | Ingram |
| 4,378,950 A * | 4/1983 | Hart et al. ..................... 303/36 |
| 4,418,799 A * | 12/1983 | Hart et al. ..................... 303/35 |
| 4,513,604 A | 4/1985 | Frantz et al. |
| 4,847,770 A | 7/1989 | Kane et al. |
| 5,113,694 A | 5/1992 | Sich |
| 5,239,486 A | 8/1993 | Mortier |
| 5,583,770 A | 12/1996 | Sekido et al. |
| 5,646,865 A | 7/1997 | Alfaro et al. |
| 5,695,258 A | 12/1997 | Reid et al. |
| 5,717,134 A | 2/1998 | Schlichenmaier et al. |
| 5,757,645 A | 5/1998 | Schneider et al. |
| 5,808,909 A | 9/1998 | Rees |
| 5,869,754 A * | 2/1999 | Scott et al. ..................... 73/121 |
| 6,094,977 A | 8/2000 | Vaughn |
| 6,174,033 B1 * | 1/2001 | Busch et al. .................. 303/10 |
| 6,189,980 B1 * | 2/2001 | Kull .............................. 303/7 |

OTHER PUBLICATIONS

Code of Air Brake System Test for Freight Equipment, Association of American Railroads, Standard S–486–98, Adopted Oct. 1991, Revised 1992, 1998.

* cited by examiner

Primary Examiner—Hezron Williams
Assistant Examiner—Michael Cygan
(74) Attorney, Agent, or Firm—Barnes & Thornburg

(57) ABSTRACT

A single car tester including a housing having a hanger to mount the housing to a car coupler or ladder of the car. Various configurations of valves and sensors are described to perform a single car test. The controller includes a program for uniquely performing the required tests.

6 Claims, 8 Drawing Sheets

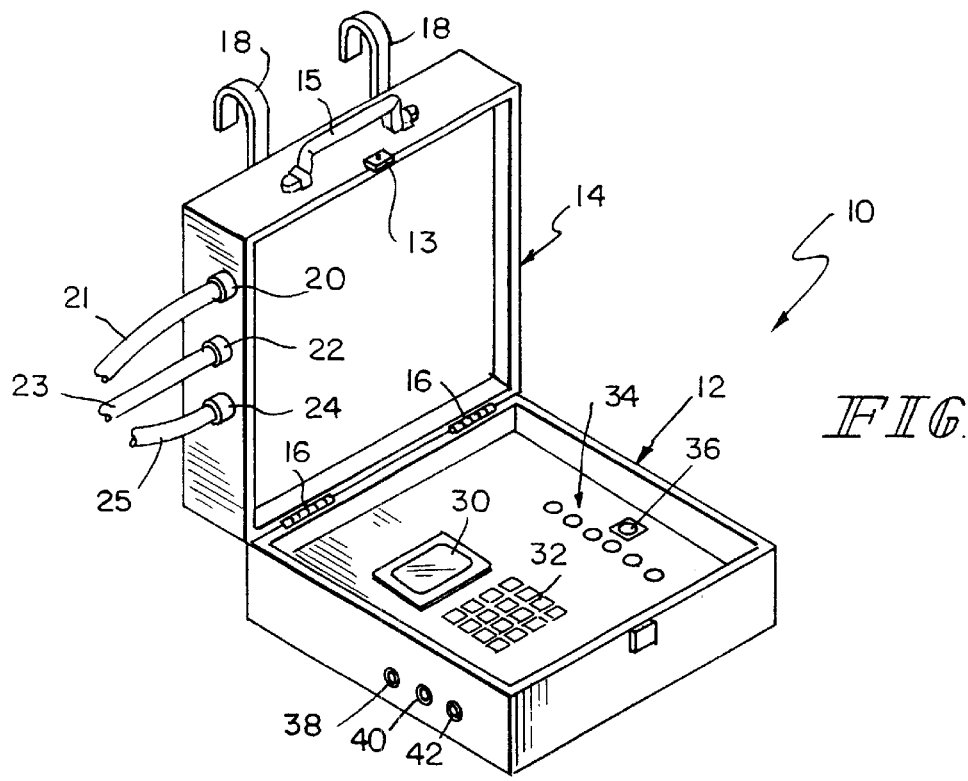
FIG. 1
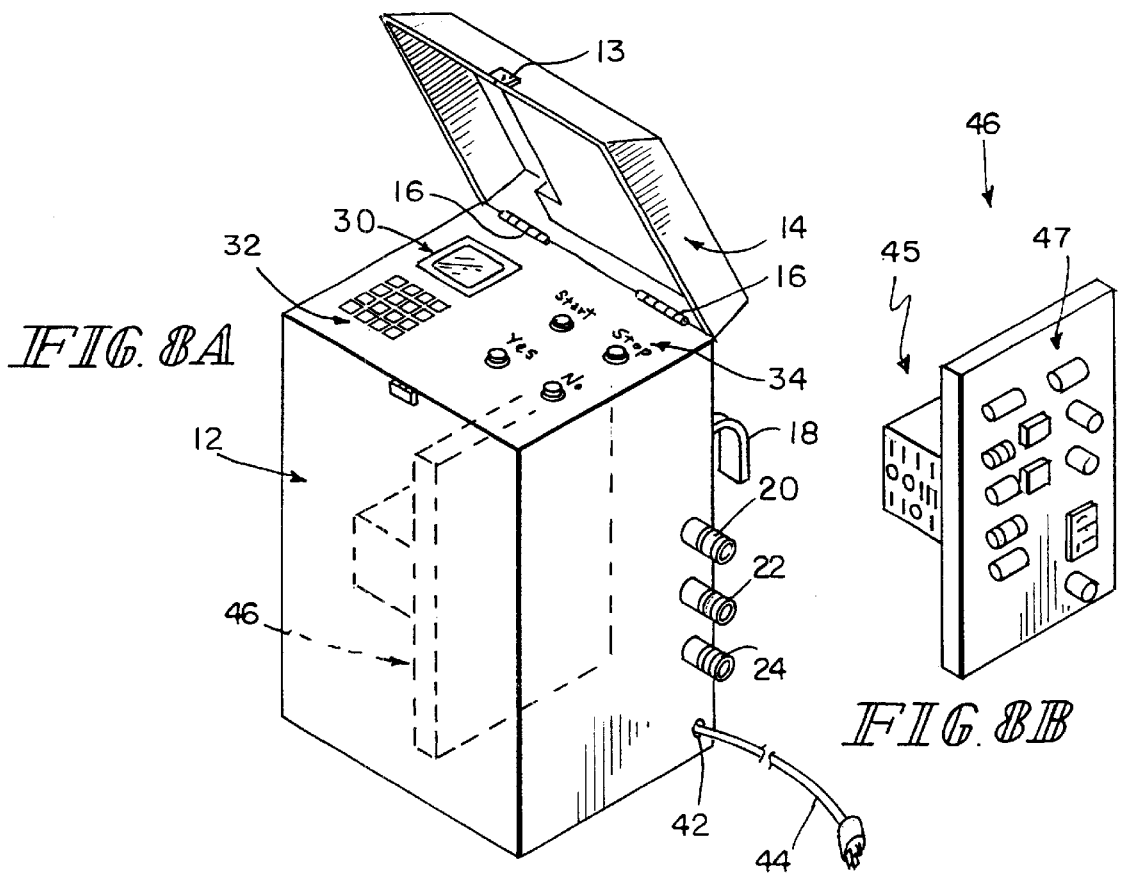
FIG. 8A
FIG. 8B

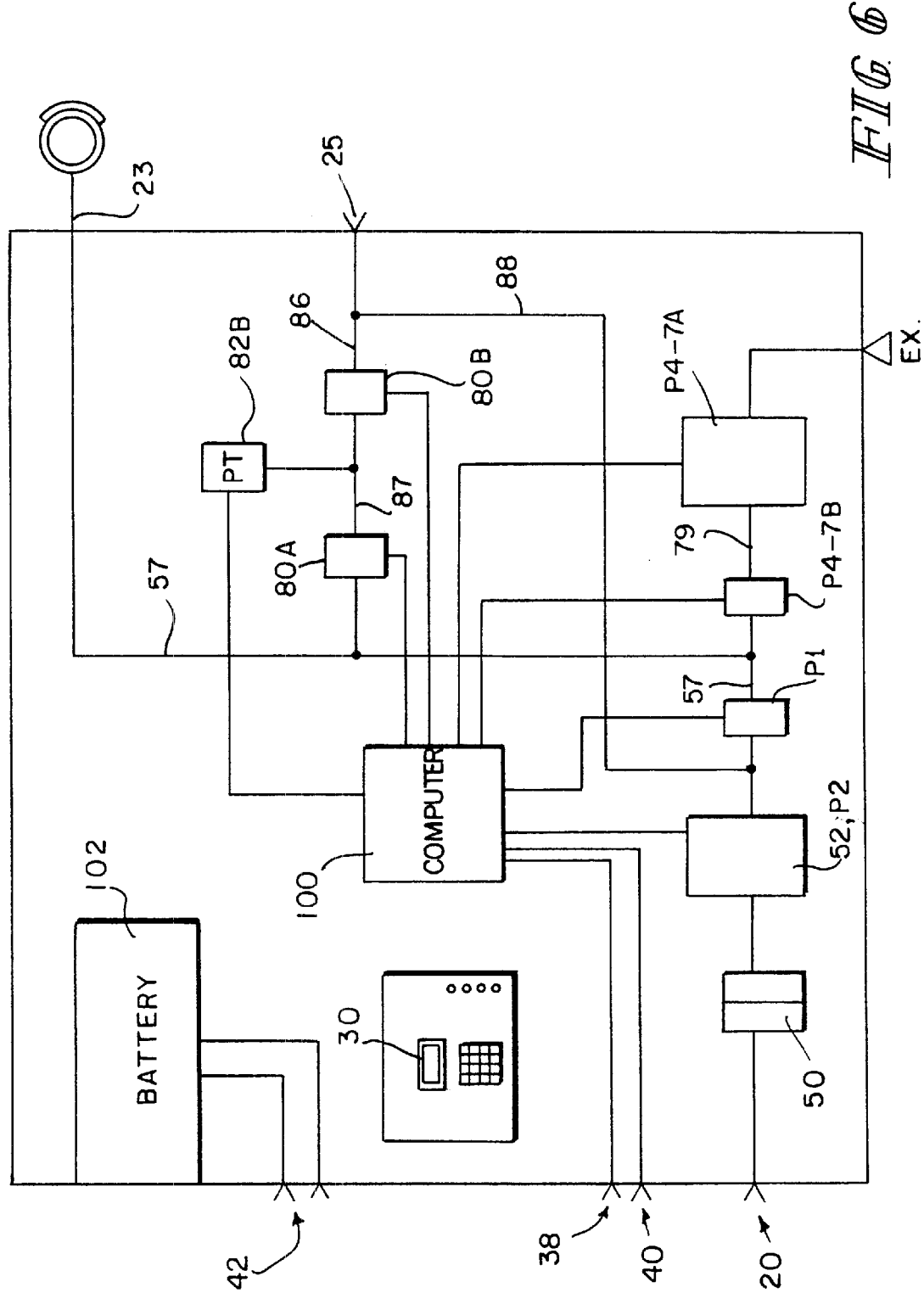

PORTABLE SINGLE CAR CHARGING AND TEST DEVICE

CROSS-REFERENCE

This is a Divisional of U.S. Ser. No. 09/324,841 filed Jun. 3, 1999 now U.S. Pat. No. 6,269,682.

BACKGROUND AND SUMMARY OF THE INVENTION

The present invention relates generally to a test device for the brake equipment of a railroad car and more specifically to a portable single car test device for a rail car brake system.

The Association of American Railroads (AAR) has established standard S-486 for testing railroad car brake systems for a single stand alone car. The Standard has two sections, namely, Section 3 for Procedures For Repair Track Test For Air Brake Equipment and Section 4 for Test-Standards Single Capacity Freight Brake Equipment.

In FIG. 1 of the Standard three single car test device with flow meters are illustrated. These devices connect to the glad hand at one end of the car which is connected to the brake pipe. The other end is connected to a source of pressure. The device is a manual device with the operator performing various tests and making readings from the meters. More recently, computerized automatic single car test devices have been designed. One such device is illustrated in U.S. Pat. No. 5,509,727. The test device is connected to four ports provided in the control valve. Various tests are performed automatically. The same pneumatic structure is used with meters as illustrated in U.S. Pat. No. 5,695,258. An electronic brake control valve tester for rail cars and trains is illustrated in U.S. Pat. No. 5,808,909. This is a computerized base tester. A tester is disclosed as connected to the brake control valve at special ports, as in the previous patents or at the glad hand.

The recent revisions to the Standards S-486 provides for testing where brake cylinder measurement taps are provided. New Rule 88 is provided which requires brake cylinder leakage test as outlined in AAR Standard S-401.

The present invention is a portable single car device for a railroad car braking system. The test device has a source port to be connected to a source of pressurized air and a brake pipe port to be connected to a brake pipe connector or glad hand. Valves are provided to selectively interconnect the ports to each other and atmosphere to perform the test. A sensor is provided to determine the pressure at least at the brake pipe port. A controller is connected to the valves and sensor and is programmed to perform the plurality of component test which forms a single car test. A housing includes a hanger configured to mount the housing to the car adjacent to the brake pipe connector. The hanger is configured to mount the housing to the car coupler or to a ladder adjacent to one end of the car.

Preferably, the single car tester is provided in housing having first and second portions connected to each other. In one embodiment, the first portion of the housing includes the controller and the second portion of the housing includes the ports, the valves and the sensors. In a second embodiment, the second portion includes the controller also. The hangar is connected to the second portion.

The first and second portions of the housing are connected by a hinge and have a use and a stored position. The tester includes an operator input device and display which are accessible when the housing is in its use position and unaccessible in the stored position.

The test device has a weight of approximately 50 pounds or less. A first hose of the first length connects the brake pipe port to the brake pipe and a second hose of a second length substantially greater than the first length, connects the brake cylinder port to the brake cylinder test port.

A brake cylinder port is also provided in the second portion of the housing to be connected to a test port or tap of the brake cylinder. The sensor also determines the pressure of the brake cylinder port. A separate sensor or a common sensor may be used to determine the flow rate between the source and the brake pipe ports. A sensor is provided to sense the pressure at the source port and may be a pressure switch.

A portable single car test device for a railroad car brake system includes a source port, a brake port and valves selectively interconnecting the ports to each other and the atmosphere to perform tests. A sensor determines the pressure at least at the brake pipe is provided. A display and an operator input device is also provided. A controller includes a program for performing a plurality of component tests which form a single car test as a function of inputs from the operator in response to displayed information.

The program requests whether the operator wants to continue the last car test. If the input is "no", the program performs the component tests. If the answer is "yes", the program determines at what point the last car test is stopped and restarts the component tests as a function of the stop point. The program restarts at one or more of the following tests: brake pipe leakage test, system leakage test, emergency test, and accelerated application valve test. The program can also restart at one or more the following starting procedures: preliminary procedures and inspections, and connecting test device to the car.

The program requests identification of the components in the system. This includes one or more of the following:
  type of control valve;
  is an empty load device present;
  is the brake cylinder body or truck mounted;
  is a brake cylinder pressure tap present;
  is a slack adjuster present;
  is an A-1 reduction valve, separate vent
  valve or separate emergency portion present; and
  the length of the car.

The program requests confirmation that a plurality of the preliminary procedures and inspections have been completed. The program prompts the operator, through the display, for each of the preliminary procedures and inspections. The preliminary procedures include chocking the wheels, releasing the hand brake, closing the dirt collector and cut-off cock, and draining the reservoirs.

The program includes a prompt with suggested corrective action for a failed component test. Upon receipt of the stop command, the program resets the brake system. Upon receipt of the start command, the program begins the component test again.

The program includes a brake pipe leakage test. This test includes operator confirmation that the angle cocks on the brake pipe are open, connecting the source port to the brake pipe port and operator confirmation that air is blowing out of the open brake pipe connector. The brake pipe leakage also includes operator confirmation of attachment of a dummy coupling to the brake pipe connector and that the retainer is set in direct release position. The program then measures the flow rate between the source and the brake pipe ports.

The program includes a separate venting device test including performing a continuous quick service test if an A-1 reduction relay or a separate emergency portion is in the brake system.

The program performs a service stability and emergency sensitivity test if a separate vent valve or an emergency portion is in the brake system. The program also includes a system leakage test and a plurality of component tests are performed subsequent to the system leakage test. After repair or replacement of the failed component, the program restarts with the system leakage test.

The system leakage test includes connecting the source port to the brake port and taking a series of brake pipe pressure measurements at a fixed interval. The leakage test takes only two measurements if the two measurements are substantially equal. The program determines if the difference between two measurement is greater or less than a first value. If greater, it continues taking measurements for no greater than a first number of pairs of measurements. If less, the program continues taking measurements for no greater than a second number of pairs of measurements. The second number of measurements is greater than the first number.

The program includes a control valve service stability test following the system leakage test. The control valve service stability test includes connecting the brake pipe port to exhaust to produce a first reduction of brake pipe pressure and measuring the brake pipe pressure after the reduction. The program then determines if the brake pipe pressure is reducing after reduction. If reducing, the program connects the source port to the brake pipe port to produce a fixed increase of brake pipe pressure which is less than the reduction. Next, the program determines if the brake pipe pressure is still reducing.

The program includes a brake cylinder leakage test following the service stability test. The brake cylinder leakage test includes connecting the brake pipe port to exhaust to produce a further reduction of the brake pipe port pressure. The program then measures the brake cylinder pressure before and after the further reduction. The difference between the measured brake cylinder pressure is compared to a first value for an empty car and to a second value for a loaded car. For an empty car which has passed the leakage test, the operator is prompted through the display to block an empty/load device in a load position. The program then connects the source port to the brake pipe port to recharge the brake pipe. The brake cylinder leakage test for the loaded car is then repeated. The brake leakage test may be performed independent of the service stability test.

The program includes an emergency test including a service sensitivity test and an emergency application test. The emergency application test measures the brake pipe pressure of a brake pipe system that does not have a brake cylinder tap and measures the brake cylinder pressure if the brake system has a brake cylinder tap.

The program includes a brake application test and a retainer valve test performed after the brake application test. The retainer valve test includes measuring brake cylinder pressure if the brake system has a brake cylinder tap. If the brake system does not have a brake cylinder tap, the program prompts the operator to move the retainer valve from a high pressure position to a direct exhaust position and report if strong air is blowing from the retainer valve.

The program also includes a brake application test and a manual release of valve test performed after the brake application test. The manual release valve test includes measuring the brake cylinder pressure if the brake system has a brake cylinder tap and includes prompting the operator to report if the brakes had released.

A method of charging a railroad car brake system through a brake cylinder tap includes connecting a source of pressurized air to the brake cylinder tap. Then, alternately connecting the brake pipe connector to the source and the atmosphere to charge the reservoir through the brake cylinder. The brake pipe is connected to the source for a sufficient time to charge a quick action chamber of the control vale and is connected to the atmosphere for a sufficient time to cause the control valve to open a first valve in the control valve which connects the reservoir to the brake cylinder. The source is then reconnected to the brake pipe after the first valve has closed.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of a single car test device incorporating the principles of the present invention.

FIG. 6 is a pneumatic schematic of a fourth embodiment of a single car test device using a pressure regulator and incorporating the principles of the present invention.

FIG. 8A is a perspective view of a single car test device showing a second embodiment incorporating the principles of the present invention.

FIG. 8B is a perspective view of the electronics and pneumatics of the single car test device of FIG. 8A.

DETAILED DESCRIPTION OF THE PREFERRED EMBODIMENTS

Figure 2:
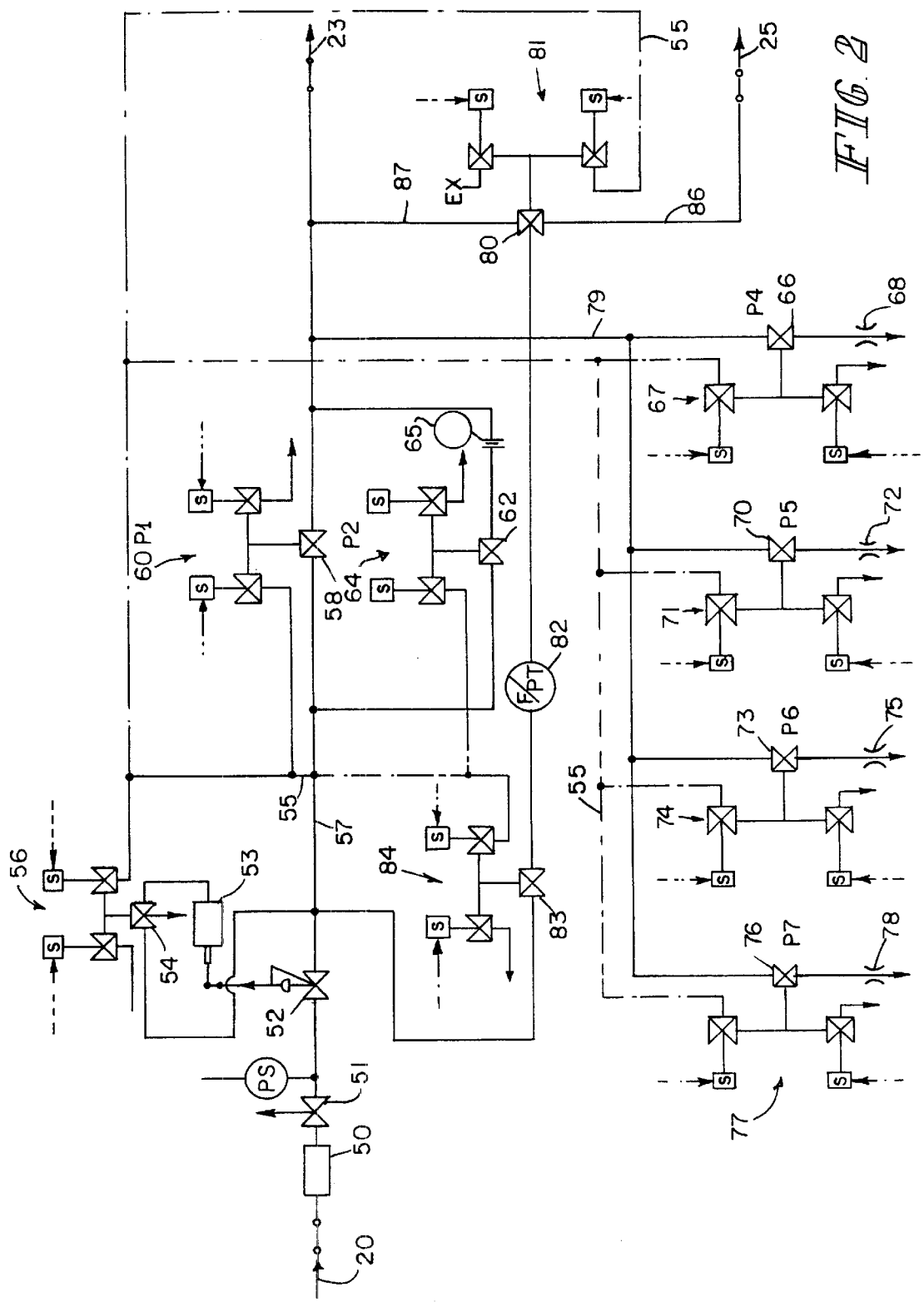
FIG. 2 is a pneumatic schematic of a first embodiment of a single car tester using a plurality of selection valves and incorporating in the principles of the present invention.

A single car test device is illustrated in FIG. 1 as including a housing 10 having a section 12 and a section 14 joined together. Preferably, they are joined together by a hinge 16. A pair of hooks or hangers 18 are mounted to the housing 10. The hooks 18 are designed specifically to attach to a ladder at one end of the car adjacent to the brake pipe connector or glad hand. The hooks 18 may also be designed to attach to the car coupler. The pneumatics and pneumatic control portion of the single car tester is provided in the housing section 14 whereas the controller and electronics are provided in section 12. This provides the greatest weight in the housing section 14 which is attached directly to the car by hooks 18 in FIG. 1, and minimizes the weight in the cantilever housing section 12. Depending upon the type of battery used, it may be in sections 12 or 14. The electrical connections to the solenoids of the pneumatic control portion as well as the sensors in section 14 are connected to the electronics in section 12.

The housing section 14 includes a source port 20, a brake pipe port 22 and a brake cylinder port 24. Hoses 21, 23 and 25 are connected respectively to ports 20, 22 and 24. The brake pipe hose 23 may be, for example, a ¾ inch inside diameter hose and the brake cylinder hose 25, may be a ⅛ inch inside diameter hose. Preferably, the brake pipe hose 23 has a glad hand connected to the glad hand of the brake pipe and is preferably approximately 8–10 feet long. The brake cylinder hose 25 is substantially longer and may be in the range of 50 feet. Since the single car test device is to be mounted adjacent to the brake pipe connector, it does not have to be long. The location of the brake cylinder tap may be at various positions in the car and therefore requires a substantially longer hose. A source of pressurized fluid may be on a portable cart or may be connected directly to a compressor and reservoir within a test yard.

The housing section 12 includes a display 30 and a key pad 32. Additional operator inputs or buttons 34 are provided as well as a light 36. The display 30 may be two lines or more to provide appropriate information and prompts, but it may be larger. The keypad 32 is preferably a 4×4 keypad but again, may be a full keypad, if required. The buttons 34 may include, for example, "start", "stop", "yes", "no", and an "on/off" switch. Some of the buttons 34 may be eliminated and the "start/stop", "yes/no" may be on the keypad 32. The housing section 12 also includes three electric ports illustrated as a computer port 38, a printer port 40, and a power port 42. This allows the connection of the microprocessor controller within the housing section 12.

Another embodiment of a single car test device and housing 10 is illustrated in FIGS. 8A and 8B. Those elements having the same function and operation of those of FIG. 1 have the same reference number. The housing 10 having sections 12 and 14 joined together by hinge 16. A source port 20, brake pipe port 22 and brake cylinder port 24 are in the housing section 12. The power port 42 and its line 44 is shown as including an electric line 45 to be connected to a source of AC power. Display 30, keypad 32 and operator input or buttons 34 are shown in the housing section 12. In this embodiment, there is nothing in the housing portion 14. Depending upon its size, portion 14 can be used to store the hoses or tubes to be connected to the ports 20, 22 and 24.

A support 46, shown in phantom in FIG. 8A and in detail in FIG. 8B, has attached to one side the electronics or controller 45 and to its other side, the pneumatic or electropneumatic devices 47. The hooks 18 are connected to section 12 since it includes all of the weight versus the section 14 as in FIG. 1.

In FIGS. 1 and 8A, the housing sections 12 and 14 are shown in their use position. This allows access to the display 30, keypad 32 and the operator input or buttons 34. In a stored position, the sections 12 and 14 are joined so as to cover the display 30, keypad 32 and buttons 34. A latch 13 is schematically shown to secure the housing sections 12 and 14 in their stored position. A handle 15 is also provided. This may be used in lieu of the hooks 18 to carry the unit. It should also be noted that the unit weighs less than 50 pounds and thus is readably transported. Wheels may be provided on the housing 10, though are not necessary.

A first embodiment showing a pneumatic portion of the single car test device is illustrated in FIG. 2. The source port 20 is connected through filter 50 and relief valve 51 to a pressure regulator 52. A diaphragm cylinder 53 controls the pressure regulator 52. The output of flow regulator 52 is fed back through valve 54 which is controlled by a pair of solenoid control valves 56. A transducer PS monitors the pressure at the source port 20. Preferably, this is a pressure switch.

The valves in the present pneumatic diagram will be given the numbers P1, P2, P3, P4, P5 and P6 which correspond to the positions in the standard mechanical single car test devices. P3 is a lap. P7 is the separate valve having a ⅜ inch opening of the standard tester. Valves P1 and P2 controls the charging of the brake pipe from the source. Valves P4, P5, P6 and P7 control the discharging of the brake pipe or other ports of the system. It should also be noted that the dash line 55 that provides the pressurized source for the apply solenoid of the solenoid pairs and is connected to line 57 which connects the source port 20 to the brake pipe port 23.

Valve P1 includes a valve 58 controlled by a pair of solenoid valves 60 and directly connects the brake pipe port 23 to a source port 20. Valve P2, in parallel to valve Pi, includes a valve 62 controlled by a pair of solenoid valves 64. A restriction 65 is in series with valve P2 and connects the source 20 to the brake pipe 23 at a reduced rate defined by the restriction 65.

The valve P4 includes a valve 66 controlled by solenoids 67. A restriction 68 is connected in series with valve 66 and exhaust. The valve P5 includes a valve 70 controlled by solenoids 72. A restriction 72 connects the valve 70 to exhaust. The valve P6 includes a valve 73 controlled by solenoids 74. A restriction 75 connects the valve P6 to exhaust. The valve P7 includes a valve 76 controlled by solenoids 77. A restriction 78 connects the valve 76 to exhaust. Valves P4, P5, P6 and P7 are connected to the brake pipe port 23 via line 79.

As in the standard single car test device, P1 has a diameter of 0.250 inches. The restrictor 65 for P2 has a diameter of 0.0225 inches. The restriction 68 for P4 has a diameter of 0.035 inches. The restrictor 72 for PS has a diameter of 0.147 inches. The restrictor 75 for P6 has a diameter of 0.1875 inches and the restrictor 78 for P7 has a diameter of 0.1875 inches.

A valve 80 including a pair of solenoid controls 81 to connect a sensor 82 to the brake cylinder port 25 via lines 85, 86 or to the brake pipe port 23 via lines 85 and 87. The valve 83 having control solenoids 84 connects the other end of the sensor 82 to line 57 which is connected to the source port 20. The valve 83 selectively connects and disconnects the sensor 82 to line 57 and in parallel to valves Pi and P2 via lines 85 and 87.

When valve 80 is normally closed, it connects the transducers 82 to the brake pipe port 23 via line 87. When it is open, it connects the transducer 82 to the brake cylinder port 25 via line 86. The sensor 82 preferably is a combined flow and pressure transducer. When valve 80 is closed and valve 83 is open, the transducer 82 measures the flow between the source port 20 and the brake pipe port 23. When valve 83 is closed, the transducer 82 can measure the pressure at the brake pipe 23 only, if 80 is closed and at the brake cylinder port 25, if 80 is open.

Figure 3:
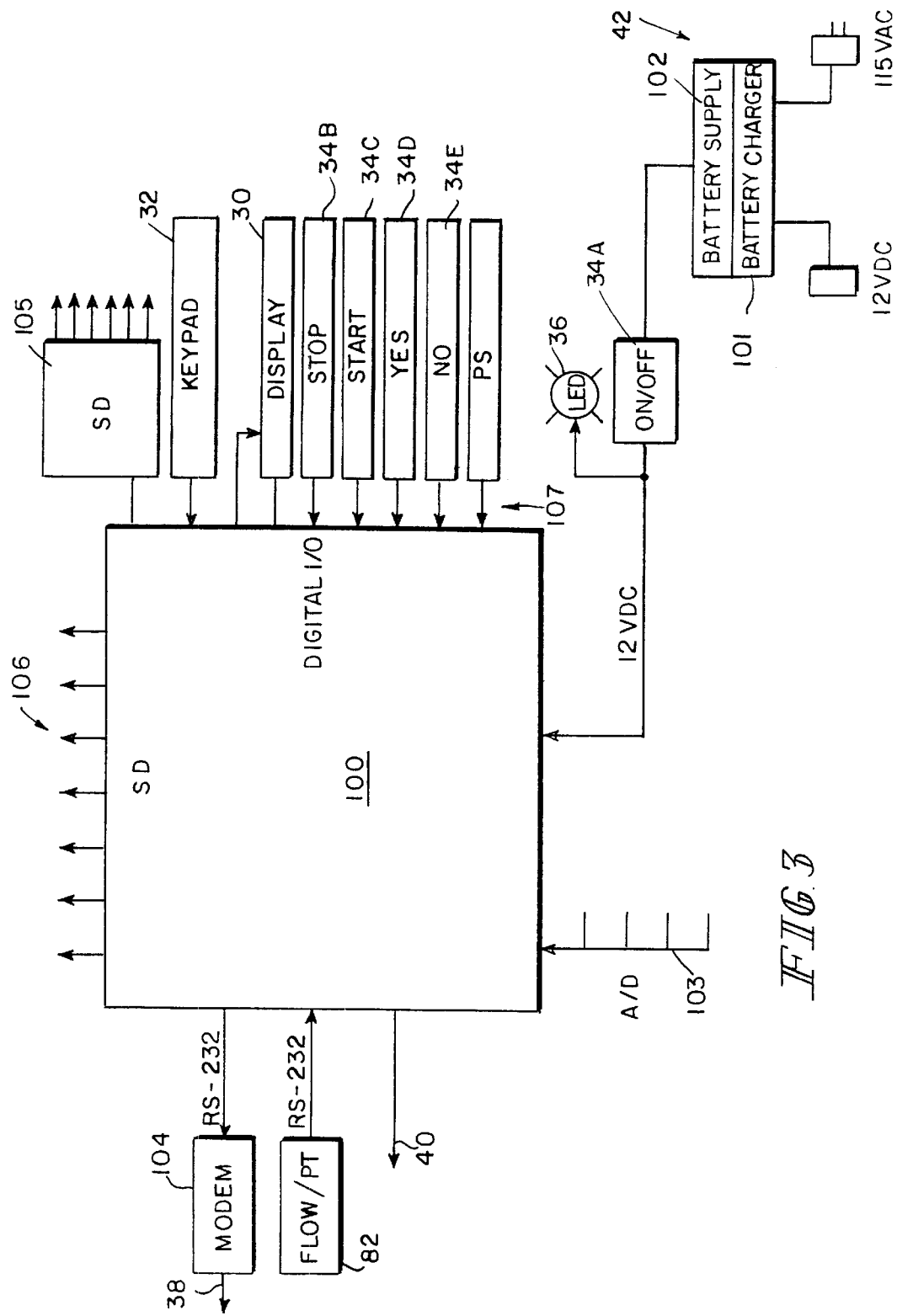
FIG. 3 is an electrical schematic of a single car test device incorporated the principles of the present invention.

A schematic of the electronics is illustrated in FIG. 3. A microprocessor 100 is shown and includes a memory for the test results as well as a program for performing the test. The power port 42 is shown as having 115 volt AC connector or a 12 volt battery connected thereto. It includes a battery charger 101 and a battery supply of 102. The on/off switch 34A connects the battery supply 102 to the computer 100. The on/off indicator 36 is also shown. Analog input 103 is also provided at the computer. It may include additional pressure transducers, battery monitor and a RTD temper rate. The computer port 38 is connected to the computer 100 by a modem 104. The printer port 40 is also shown. The flow or pressure transducer 82 is connected to computer 100.

The computer 100 may have seven solenoid drivers SD at interface 106 connected to the solenoid control valves of valves P. An additional solenoid driver board 105 is provided since there are sixteen solenoids. Keypad 32 is also connected to the computer 100 at digital I/O interface 107. The stop button 34B, the start button 34C, the "Yes" button 34D and the "No" button 34E are also connected to the computer 100 as is pressure switch PS at interface 107.

Figure 4:
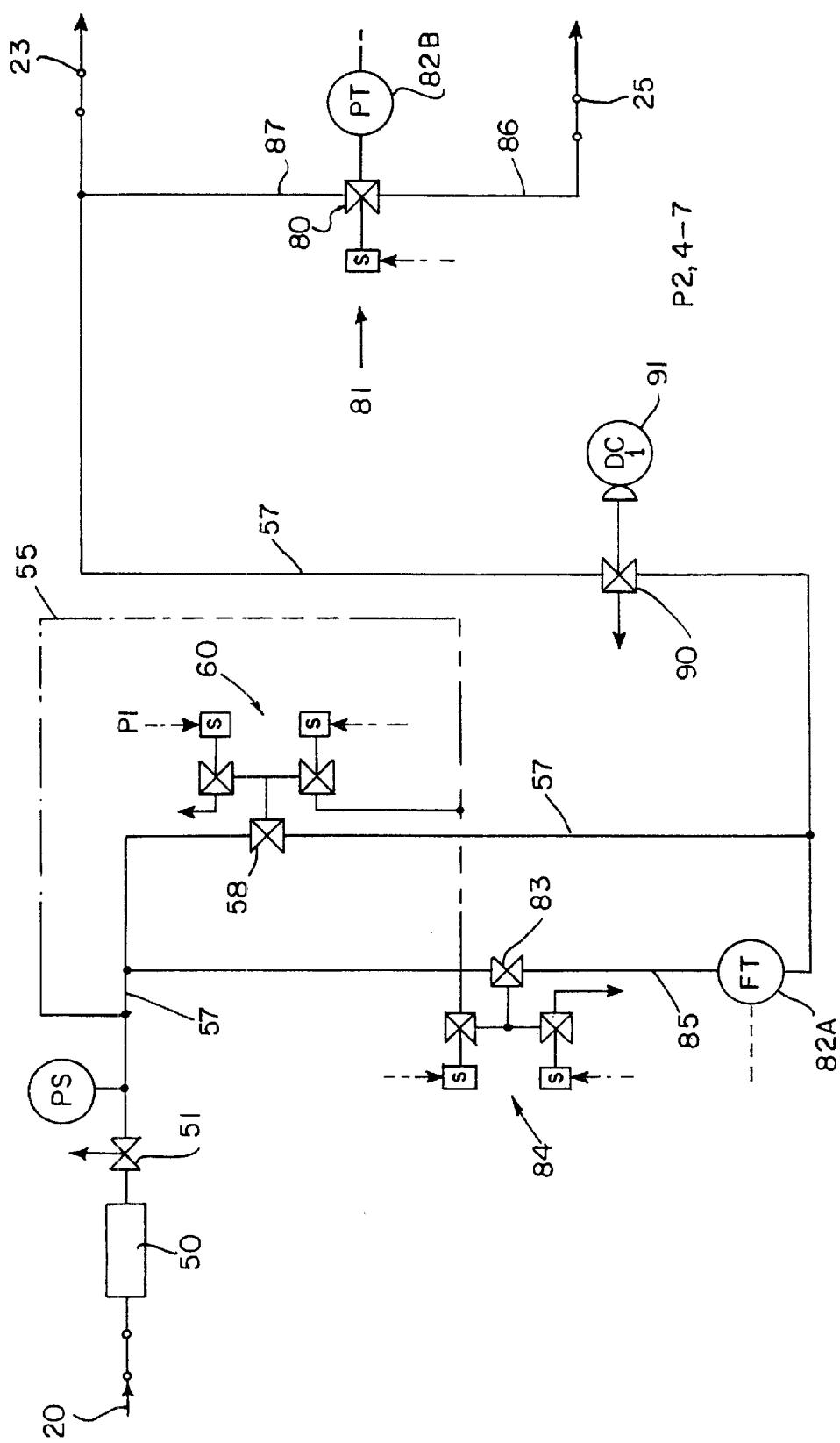
FIG. 4 is a pneumatic schematic of a second embodiment of a single car test device using a linear selection valve and incorporating the principles of the present invention.

A second embodiment of the pneumatic is illustrated in FIG. 4. Those elements that have the same form and function of FIG. 2 have the same number. The regulator valve 52 and its control circuit 53, 54 and 56 have been deleted. Only a single charging valve 58 with solenoid 60 are needed. Valve 83 and its solenoids 84 are connected in series with a flow transducer or sensor 82A which is in parallel to the charging valve 58. The valve 80 and the single solenoid valve 81 controls the connection of a separate pressure transducer or sensor 82B to either the brake pipe port 23 or the brake cylinder port 25 via lines 87 and 86 respectively. Discharge valves 66, 70, 73 and 76 as well as their solenoid valves 67, 71, 73, 77, have been replaced by a single linear valve 90 controlled by DC motor 91. Valve 90 acts not only as the regulator for charging the source but also controls the discharge rate of the brake pipe 23 under the control of DC motor 91. Such a linear valve is model 27G50 from HR Textron/Triuline.

Figure 5:
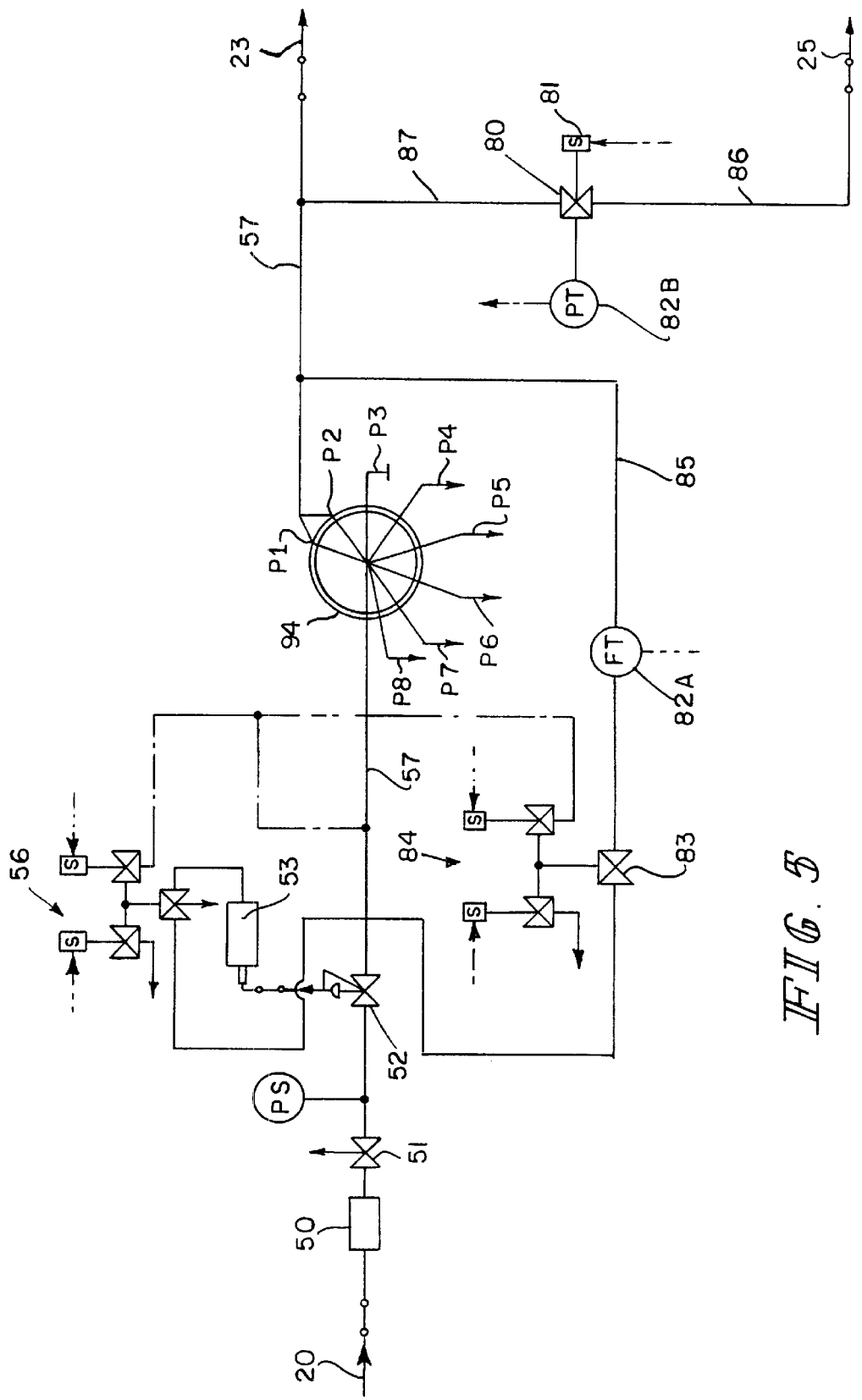
FIG. 5 is a pneumatic schematic of a third embodiment of a single car test device using a rotary valve and incorporating the principles of the present invention.

Another embodiment illustrating a rotary valve is illustrated in FIG. 5. Those elements which have common structure and operation of FIGS. 2 and 4 have the same number. In this embodiment, the regulator valve 52 with its control elements 53, 54 and 56 are included. The charging valve 58 and 62 with their solenoids 60 and 62 as well as the discharge valve 66, 70, 73, 76 and their solenoids 67, 70, 71, 74 and 77 have been replaced by a single motor controlled rotary valve 94. This valve has a limit switch and cam positioning. Each of the positions corresponds to the six positions of the manual single car test device and the ⅜ valve. As in FIG. 4, a flow transducer 82A, having valve 83 and its solenoids 84 connect the flow transducer 82A in parallel to the rotary switch 94 via line 85. The valve 80, either which connects the pressure transducer 82B to the brake cylinder port 25 or the brake pipe port 23 via lines 86, 87 respectively, is controlled by a single solenoid 81.

A fourth embodiment of the single car test device is illustrated in FIG. 6. A variable pressure regulator performing the functions of valve 52 and P2 is connected to the source 20 by filter 50. Valve P1 connects the pressure regulator 52, P2 to the brake pipe port 23 via line 57. Discharge valve P4–7B connects the brake pipe line 57 port 23 to exhaust through a pressure regulator P4–7A. The pressure regulator P4–7A defines the different restrictions for discharge. Pressure transducer 82B is selectively connected to the brake pipe port 23 via valve 80A and to the brake cylinder port 25 by valve 80B.

FIGS. 2, 4, 5 and 6 are just four examples of pneumatic systems which are capable of performing the single car test device.

Figure 7A:
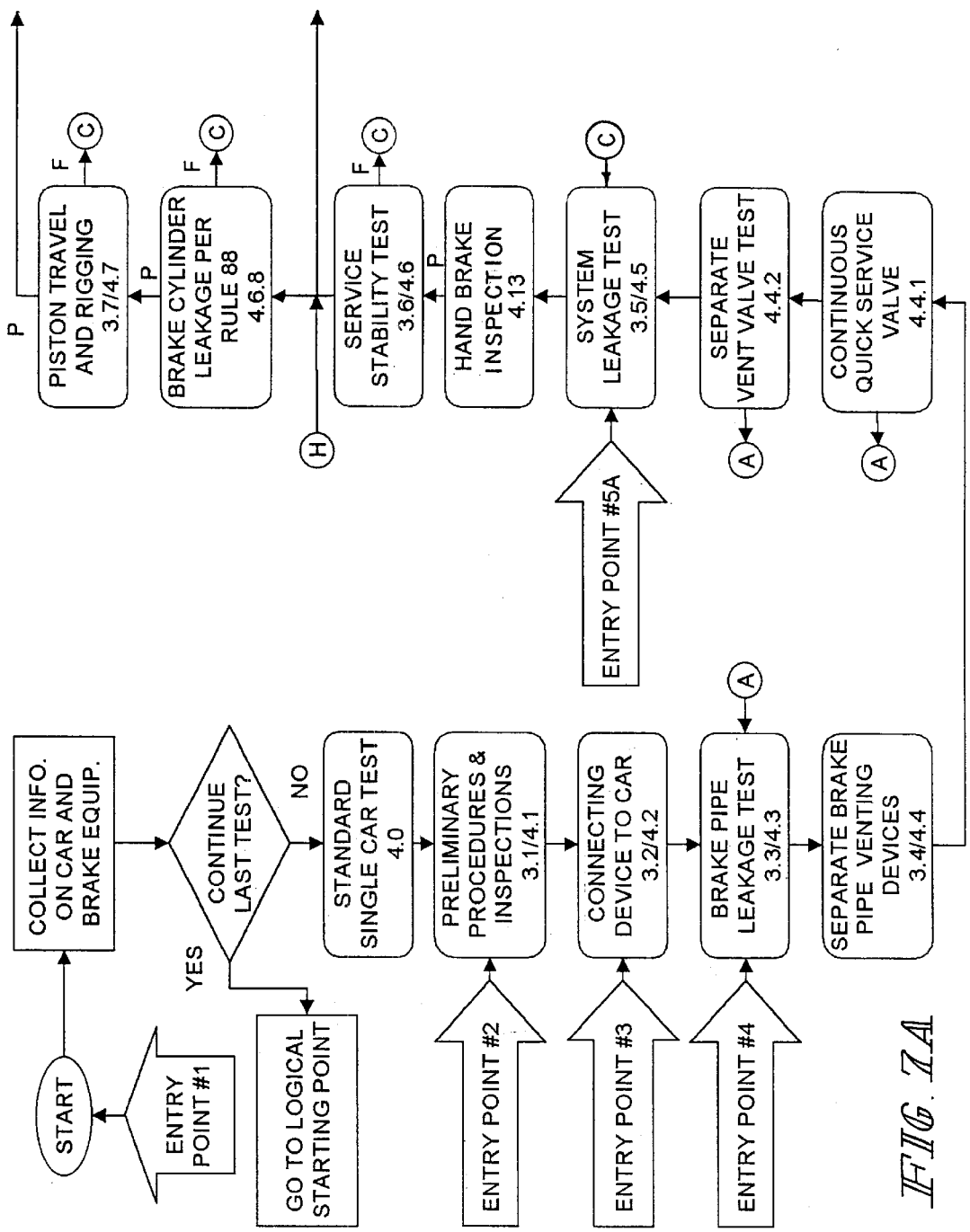
FIGS. 7A and 7b is a flow chart of the program for the single car test device incorporating the principles of the present invention.
Figure 7B:
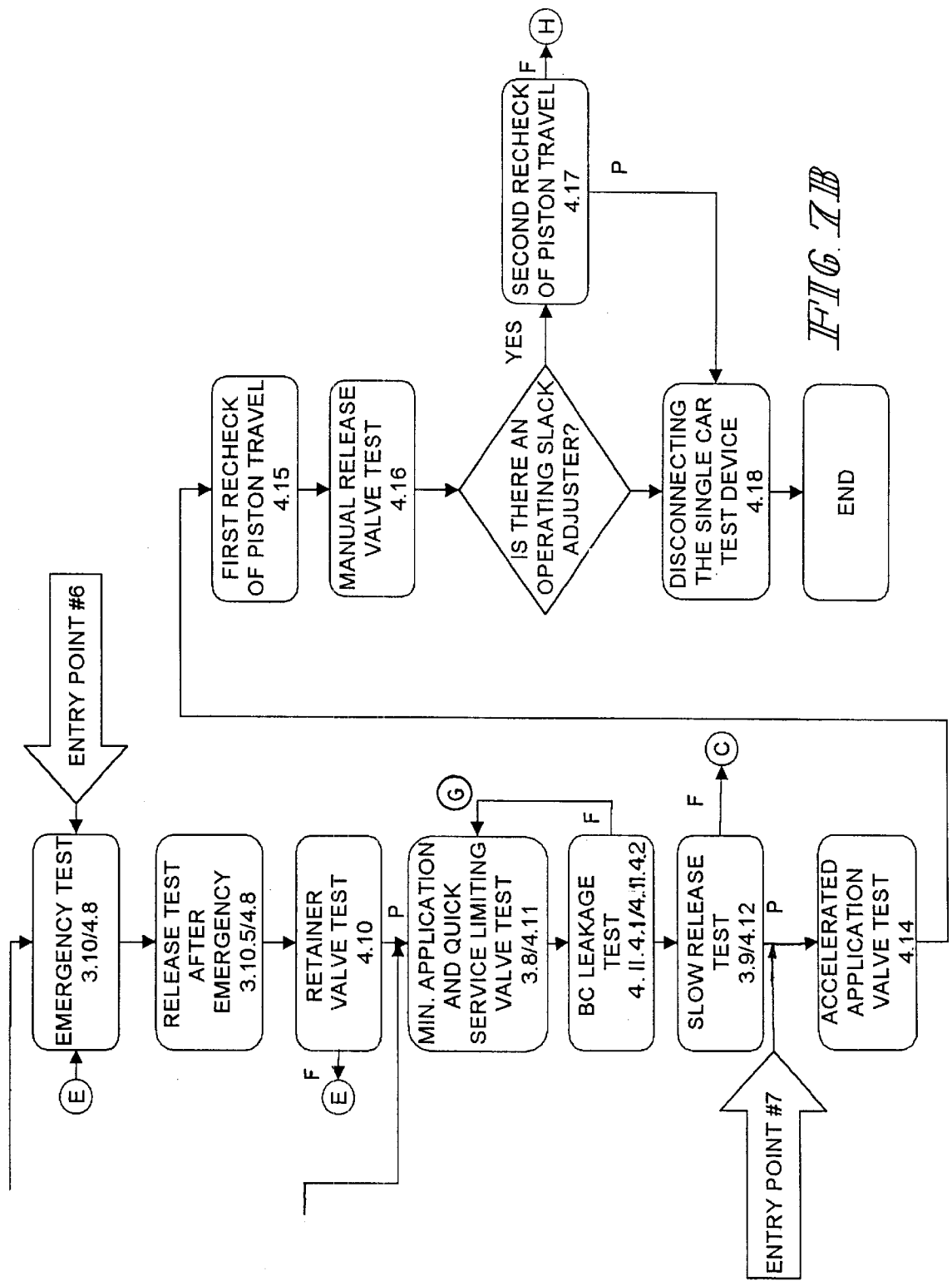

The computer 100 includes programming for performing a single car test. This includes a plurality of component tests which form the single car test. These tests are those listed in Standard S-486. Notations in FIGS. 7A and 7B are to the paragraphs of this Standard. The flow chart shows seven entry points. The present system is capable of re-entering the test at the seven points. Also, letters indicating where the test is interrupted and branches to another portion of the test. The software provides prompts to the operator and requests information to be inputted. It also prompts the operator to make certain observations and perform certain operations and to verify that they have been done. The prompts also provide corrective action for failed tests.

The program begins at entry point 1 and collects information on the operator, car and brake equipment. It requests identification of the operator and the car number. When it is the same operator and car number as the last test, the program asks whether the operator wants to continue the last test. If the operator responds "yes", then it goes to logical starting point which could be one of the seven entry points. If the operator says "no", then it collects information in addition to the operator and car number. The information collected is the type of control valve, is an empty-load device present, is the brake cylinder body or truck mounted, is a brake cylinder pressure tap present, is a slack adjuster present, is an A-1 reduction valve, a separate vent valve or a separate emergency portion present, and the length of the car. These may be entered in by typing in this information or preferably by prompts being provided and the applicant responding "yes" or "no".

Next, the Preliminary Procedure and Inspection is performed. This is entry point 2. The computer program prompts the operator through the displays for each of the preliminary procedures and inspection. The preliminary procedures include chocking the wheels, releasing the hand brake, closing the dirt collector and cut-off cock, and draining the reservoirs. These instructions are provided and the operator confirms that they have been completed. It may also include determination of whether the brake cylinder push rod is fully retracted, are the brake shoes correct, are there any worn levers or pins, do any levers or rods bind or foul, are all of the air brake hoses in good condition and within age limits, and have the glad hand gaskets been replaced. If the answer is "no" to any of these questions, the prompt provides instructions on the appropriate remedy.

Upon completion of the Preliminary Procedures and Inspections, the program then prompts through, connecting the test device to the car. This is entry point 3. This portion of the program inquires whether the pressure regulator has been set to 90 psi, has the test device been coupled to the brake, has the dirt collector and cut-off cock been closed, have the reservoirs been completely drained and has the vent valve street elbow and vent protector been loosened.

The next program in sequence is a Brake Pipe Leakage Test and this entry point 4. This test begins with inquiring whether both the angle cocks have been opened. Next, it requests that the start button be pushed. The computer then closes all valves and sets the regulator to 90 psi, followed by opening charging valve P1. The computer then prompts to find out whether there is air blowing at the open end of the brake pipe. If not, corrective action is provided as a prompt and after verification of a completion of the correction, it cycles back to closing all valves and setting the 90 psi and then opening valve P1.

The repair sequence may include a prompt to push the "stop" button and an indication to clear the obstruction. Upon receiving the "stop" signal, it closes the valve P1 and opens valve P6 to drain the brake pipe. The prompt then requests that after repairs have been completed, to push the "start" button. The "start" button restarts the test.

If the blowout test is completed satisfactorily, a prompt to attach a dummy coupling to the open glad hand is provided. The computer then prompts the operator to verify that the retainer is in the direct exhaust position. Once this is confirmed, and awaiting for a short period, for example, two minutes, there is a measurement of the flow rate between the source and brake pipe ports. Depending upon this measurement, the leakage test has either passed or failed. If it has failed, corrective action is prompted with resetting the system by closing PI and opening P6 to drain the brake pipes.

Next, Separate Brake Pipe Venting Device Tests are performed. This begins with the Continuous Quick Service Test. If an A-1 reduction valve or a separate emergency portion is in the brake system, P1 is closed and P4 is open. If there is an intermittent exhaust at the quick service or emergency valve, the exhaust test has been passed. Next, the valve P4 is closed, and P1 is open. Depending upon the length of the car, instructions are provided to plug the quick service valve exhaust.

This is followed by the Separate Vent Valve Test. If there is a separate valve or a separate emergency portion, Service Stability and Emergency Sensitivity Tests are performed. For the Service Stability Test, P1 is closed and P5 is open. If the car is longer than 75 feet, and the separate emergency portion is present, valve P6 is open instead of P5. Valves PS and P6 are closed when the brake pipe is reduced to 50 psi. If the brake pipe was not reduced to zero, then the service stability test has been passed. Next, the Emergency Sensitivity Test is performed, by determining whether the brake pipe is between 40 and 50 psi. If it is, valves P6 and P7 are open. Next, it is determined whether the brake pipe is zero. If it is, the emergency sensitivity test has passed.

Entry point 5 is the System Leakage Test, which begins with closing all valves and setting the regulator to 90 psi and then opening valve P1 to charge the brake pipe. The program waits for the brake pipe to be fully charged, which is generally about 10 minutes. During this time, the operator is prompted to perform certain tasks and inspections. For example, the operator is prompted to determine whether the dirt collector and cut-off valve is open. Next, the hand brake inspection is performed.

One of the limitations on the time for charging the brake pipe and filling the emergency and auxiliary reservoirs on the car is the charging choke in the control valve. One method of filling the reservoirs and bypassing the charging choke is to charge through the brake cylinder as illustrated in FIG. 6. The control valve CV includes a quick action chamber QA which is connected to the brake pipe BP. The quick action chamber controls a high pressure valve, which, for an emergency brake application, interconnects the emergency reservoir to the brake cylinder. The emergency reservoir and auxiliary reservoir R are interconnected during the charging operation. With the emergency valve in an emergency condition, the quick action chamber is discharged to atmosphere. When it reaches a minimum level, the high pressure valve is closed cutting off the brake cylinder BC from the emergency reservoir. In order to continue to charge the emergency and auxiliary reservoirs R from a charged brake cylinder BP, the quick action chamber QA must be charged repeatedly in order to keep the high pressure valve open, which interconnects the brake cylinder BC and the reservoir R.

In order to perform this back charging of the reservoirs, lines 86 and 87 of the tester would have to be increased from a small measuring diameter hose to a larger charging diameter hose and valve 80 would have the capability to interconnect lines 86 and 87 Alternatively, a separate connection and valve between the brake cylinder port 25 and brake pipe port 23 would be provided.

As illustrated in FIG. 9, the charging program could include the following steps. Opening valve P1 to charge the brake pipe for a preliminary period, for example, 30 seconds. This will also charge the quick action chamber. Charging valve P1 is closed and valves P6 and P7 are opened to discharge the brake pipe and create an emergency condition. Valve 80 is open to connect the source port to the brake cylinder port. The quick action chamber opens the high pressure valve which connects the charged brake cylinder to the emergency and auxiliary reservoirs. Once the quick action chamber has been reduced below the level which will close the high pressure valve, generally for about 40 seconds, the charging valve P1 is reopened to charge the brake pipe to, for example, 25 psi. After sufficient time, for example, 60 seconds, the quick action chamber is charged to approximately 50 psi, valves P6 and P7 are opened again to create an emergency condition.

The process of alternately connecting the brake pipe port to the source port and atmosphere is repeated. Finally, the remainder of the system continues to charge. When the control valve has released the brake, the connection through 80 of the source to the brake cylinder port is closed. This charging process will take approximately eight minutes, which provides a savings of two minutes.

During charging, the software then records a first leakage value, waits a fixed period of time, for example, two minutes, then records a second leakage value. If the leakage value is below a predetermined value, for example, 225 cubic inches, then the software determines whether the two leakage levels are approximately equal. If they are, the Leakage Test has passed. If not, the program performs another measurement of a pair of leakage values for a fixed number of times until the two leakage valves are substantially equal. This may be, for example, six pairs. If the leakage is above the predetermined amount, then a fewer number of pairs will be measured, for example, 3, before a failed determination is made.

Next, a Service Stability Test is performed. The computer connects the brake pipe port to the exhaust port to produce a fixed reduction of the brake pipe pressure. Depending upon the length of the car, valve P1 is closed and valve P5 or P6 is open to reduce the brake pipe, for example, to 65 psi. Then valve PS–P6 is closed and valve P4 is open to reduce the brake pipe to 60 psi. Then valve P4 is closed. The brake pipe measurement is then taken. If brake pipe was reduced to zero, then the Stability Test failed. Upon failure of the Stability Test, an appropriate corrective action is displayed and valve P6 is open to drain the brake pipe. The system then cycles back to the beginning of the System Leakage Test.

If the brake pipe has not been reduced to zero, determination is made to see if the brake pipe is reducing. If it is not, the Service Stability Test has passed. If the brake pipe is reducing, the brake source port is connected to the brake pipe port to produce a fixed increase of the brake pipe pressure, less than the reduction. Then a determination is again made of whether the brake is reducing. This is repeated a couple of times before a failed test is produced. The brake source port is connected to the brake pipe port by opening valve P2.

Following the Service Stability Test, a Brake Cylinder Leakage Test is performed, if required by Rule 88, and there is a presence of a brake cylinder pressure tap. The Brake Cylinder Leakage Test includes connecting the brake pipe port to exhaust by opening P5 to reduce the brake pipe pressure, for example, to less than 50 psi. Then valve P5 is closed. After waiting for the temperature effect to pass, for example, three minutes, the brake cylinder pressure is then read twice over another period of time, for example, five minutes. The two pressures are compared. If the car is loaded, it is compared to a first value, and if it is empty, it is compared to the second value. If it is empty after comparing against the first number, valve P1 is open and a prompt is provided that the empty/load valve is to be blocked into the loaded position and the test is repeated with a comparison with the difference being compared to the loaded car first value.

Next, the Piston Travel and Rigging Test is performed. This is performed by prompting and requiring inspection and measurement by the operator.

As noted in the diagram, if there is failure during the service stability test, the brake cylinder leakage test or the piston and travel and riggings, corrective action is taken and the program cycles back to the beginning of the system leakage test. This is denoted by the letter C in the diagram.

Next, an Emergency Test is performed which includes Service Stability Test and an Emergency Application Test. This is entry point 6. The Emergency Test begins by closing all valves and opening charging valve P1 to recharge the brake pipe. Depending upon the length of the car, P1 is closed and valves P5 or P6 is open to reduce the brake pipe to 50 psi. The brake pipe pressure is then measured to determine whether the Service Stability Test has been passed or not. Depending upon the length of the car, valves P6 and P7 or valves P4, P6 and P7 are open to reduce the brake pipe to 70 psi. The Emergency Application Test is then performed by measuring brake pipe pressure if the brake system does not have a brake cylinder tap. If the brake system has a brake cylinder tap, the brake cylinder pressure is measured.

The Release After Emergency Test is performed. This includes opening valve P1 to charge the brake pipe to, for example, 28 psi and determining whether brake pipe pressure has increased. Next, a Retainer Valve Test is performed. The Retainer Valve Test includes opening valve P1. If the brake cylinder tap is provided, the brake cylinder pressure is measured and compared to a predetermined value. If not, it prompts the operator to move the retainer valve to a direct exhaust position and report if strong air is blowing from the retainer valve.

Next, a Minimum Service Application And Quick Service Limiting Valve Test is performed. The brake pipe is reduced to 87 psi by opening valve P4. The brake pipe pressure is measured, and if it is below 85, then valve P2 is opened momentarily to recharge the pipe. Then, the brake pipe pressure is measured again. If the Minimum Service Application Test is passed, then the Quick Service Activity Test is performed. This includes setting the regulator to 80 psi and opening valve P1. The quick service activity is an observation entered by the operator.

Next, a Brake Cylinder Leakage Test is performed. The test is either performed using brake cylinder measurements if a brake cylinder tap is provided or if not, using a flow meter per the Standard. If the leakage test fails, the program reverts back to the Minimum Application And Quick Service Limiting Valve Test.

Next, the program performs a Slow Release Test. The supply is adjusted to 90 psi and valve P2 is open and a timer is started. The brake cylinder pressure is measured over a various period of time to perform the Slow Leakage Test per the Standard. Once the Slow Leakage Test has been terminated, all valves are closed. The regulator is set to 90 psi and valve P1 is opened to recharge the system. This is entry point 7.

Next, the Accelerated Application Valve Test is performed. Valve P4 is opened and the operator is prompted to check for accelerated application valve portion activity. If it is noted, then the first recheck of piston travel is performed. This includes continued reduction to 60 psi and prompting of measurement of the brake cylinder piston travel.

Next, a Manual Release Valve Test is performed. The brake pipe pressure is measured. If it is between 40 and 60 psi, valves P4, P6 and P7 are opened to vent the brake pipe to zero. All valves are then closed and the manual brake cylinder release valve is operated. If the brake system has a brake cylinder tap, the brake cylinder pressure is measured. If not, the operator is prompted to report if the brakes have released.

Next is a determination whether there is an operating slack adjuster If "no", the program enters into disconnecting the single car test device. If "yes", there is second recheck of the piston travel. If it passes, the program enters into the disconnecting the single car tester device. This includes various prompts, including measuring leakage at the brake cylinder tap and removing the equipment and resetting the system.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A single car test device for a rail car brake system having a brake pipe with a connector, a brake cylinder, a reservoir and a control valve connected to the brake pipe, the reservoir and brake cylinder, the test device comprising:

a source port to be connected to a source of pressurized air, a brake pipe port to be connected to the brake pipe connector and a brake cylinder port to be connected to the brake cylinder;

valves selectively interconnecting the ports to each other and atmosphere to perform tests;

a sensor determining pressure at least at the brake pipe port;

a display;

operator input device; and a controller connected to the display, input device, valves and sensor, the controller including a program performing a plurality of component tests which form a single car test as a function of inputs from the operator in response to displayed information and a charging program which connects the source port to the brake cylinder port and alternately connects the brake pipe port to the source port for a sufficient time to charge a quick action chamber of the control valve and to atmosphere for a sufficient time to cause the control valve to open a first valve in the control valve which interconnects the reservoir to the brake cylinder to substantially charge the reservoir through the brake cylinder port and the control valve.

2. The test device according to claim 1, wherein the charging program reconnects the source to the brake pipe after the first valve has closed.

3. A single car test device for a rail car brake system having a brake pipe with a connector, a brake cylinder, a reservoir and a control valve connected to the brake pipe, reservoir and brake cylinder, the test device comprising:

a source port to be connected to a source of pressurized air, a brake pipe port to be connected to the brake pipe connector and a brake cylinder port to be connected to the brake cylinder;

valves selectively interconnecting the ports to each other and atmosphere to perform tests;

a sensor determining pressure at least at the brake pipe port; and a controller including a program performing a plurality of component tests which form a single car test and a charging program which connects the source port to the brake cylinder port and alternately connects the brake pipe port to the source port for a sufficient time to charge a quick action chamber of the control valve and to atmosphere for a sufficient time to cause the control valve to open a first valve in the control valve which interconnects the reservoir to the brake cylinder to substantially charge the reservoir connected to through the brake cylinder port and the control valve.

4. The test device according to claim 3, wherein the charging program reconnects the source to the brake pipe after the first valve has closed.

5. A method of charging a rail car brake system having a brake pipe having a connector, a brake cylinder having a tap, a reservoir and a control valve connected to the brake pipe, reservoir and brake cylinder, the method comprising:

connecting a source of pressurized air to the brake cylinder tap;

alternately connecting the brake pipe connector to the source for a sufficient time to charge a quick action chamber of the control valve and to the atmosphere for a sufficient time to cause the control valve to open a first valve in the control valve which interconnects the reservoir to the brake cylinder to charge the reservoir through the brake cylinder and the control valve.

6. The method according to claim 5, wherein the source is reconnected to the brake pipe after the first valve has closed.

* * * * *